(12) United States Patent
Haka

(10) Patent No.: US 6,425,841 B1
(45) Date of Patent: Jul. 30, 2002

(54) MULTI-SPEED POWER TRANSMISSION

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 33 days.

(21) Appl. No.: 09/648,760

(22) Filed: Aug. 28, 2000

(51) Int. Cl.$^7$ .................................................. F16H 3/66
(52) U.S. Cl. ...................................... 475/275; 475/286
(58) Field of Search ................................. 475/269, 271, 475/275, 286, 317, 323, 325

(56) References Cited

U.S. PATENT DOCUMENTS

| | | | | |
|---|---|---|---|---|
| 3,915,033 A | * | 10/1975 | Polak | 475/286 |
| 3,971,268 A | * | 7/1976 | Murakami et al. | 475/276 |
| 6,053,839 A | * | 4/2000 | Baldwin et al. | 475/281 |
| 6,083,135 A | * | 7/2000 | Baldwin et al. | 475/276 |
| 6,217,474 B1 | * | 4/2001 | Ross et al. | 475/269 |

FOREIGN PATENT DOCUMENTS

| JP | 2-154841 A | * | 6/1990 |
|---|---|---|---|
| JP | 6-323381 A | * | 11/1994 |

* cited by examiner

*Primary Examiner*—Charles A. Marmor
*Assistant Examiner*—Ankur Parekh
(74) *Attorney, Agent, or Firm*—Leslie C. Hodges

(57) ABSTRACT

A power transmission has a planetary gear arrangement that includes three planetary gear sets. One of the planetary gear sets is a dedicated gear set in that one of the planetary members (reaction member) is continuously connected to a stationary member and another (input member) is continually connected with an input drive member. The dedicated planetary gear set can be arranged to provide either an underdrive or an over drive depending on the input and reaction members. The other two planetary gear sets are disposed in downstream power flow relation to the dedicated planetary gear set and are selectively connectable with both the output member of the dedicated gear set and the input drive member through a plurality of rotating torque transmitting mechanisms and at least one stationary torque transmitting mechanism. The torque transmitting mechanisms are selectively engaged in combinations of two to provide at least seven forward drive ratios and one reverse drive ratio. At least one ratio interchange involves a double transition shift sequence that can be eliminated by skip shifting.

15 Claims, 3 Drawing Sheets

MULTI-SPEED POWER TRANSMISSION

TECHNICAL FIELD

This invention relates to multi-speed power transmissions and more particularly to such transmissions having a plurality of planetary gear sets.

BACKGROUND OF THE INVENTION

Passenger vehicles, cars and trucks, have a powertrain most of which include a multi-speed planetary transmission. The transmission may be of either the countershaft type or the planetary gear type. The planetary gear type of transmissions are provided with controls to automatically change the gear ratios in the transmission as the vehicle is moving. To provide good performance, the transmission has two or more gear sets that are interconnected and a plurality of torque transmitting mechanisms, clutches and brakes, to control the operating ratios of the transmission.

The transmission generally has three or more forward speed ratios, a reverse drive ratio and a neutral condition. As the number of forward drive ratios increases, the number of gear sets and torque transmitting mechanisms increases. However, transmissions are known to provide six forward speed ratios, and a reverse ratio from three planetary gear sets and a minimum of five torque transmitting mechanisms. Also, it is possible to provide an input planetary, chain drive, or countershaft gear set that is dedicated to provide both a direct drive input and a ratio drive input to a multi-speed planetary gear arrangement. The ratio drive input can be greater than unity or less than unity thereby increasing the number of speeds available from the planetary gear arrangement. In many off-road type vehicles and hauling vehicles, this additional input gear set is termed a 'splitter'. The additional gear set can have a torque transmitting mechanism to establish the ratio drive input or it can operate to continuously provide torque to both input ratios.

SUMMARY OF THE INVENTION

It is an object of the present invention to provide an improved multi-speed transmission.

In one aspect of the present invention, an input gear set provides a direct drive and an underdrive to a plurality of selectively engageable torque transmitting mechanisms. In another aspect of the present invention, a pair of interconnected planetary gear sets are selectively connectable with the input gear set through the torque transmitting mechanisms. In yet another aspect of the present invention, at least one additional torque transmitting mechanism is selectively connectable with one member of the planetary gear sets.

In still another aspect of the present invention, the judicious selection of the torque transmitting mechanisms provides seven or eight forward speed ratios. In yet still another aspect of the present invention, the planetary gear sets have a torque transmitting mechanism selectively connectable with one member. In a further aspect of the present invention, one embodiment thereof is controlled to provide two reverse drive ratios and a minimum of seven ratios. In a yet further aspect of the present invention, the seven or eight forward drive ratios and one reverse drive ratio are attained with a minimum of five torque transmitting mechanisms. In a still further aspect of the present invention, eight forward drive ratios and two reverse drive ratios are attained with six torque transmitting mechanisms. In a yet still further aspect of the present invention, four of the torque transmitting mechanisms are rotating torque transmitting mechanisms and the remaining torque transmitting mechanisms are stationary torque transmitting mechanisms.

DESCRIPTION OF THE EXEMPLARY EMBODIMENTS

Figure 1:
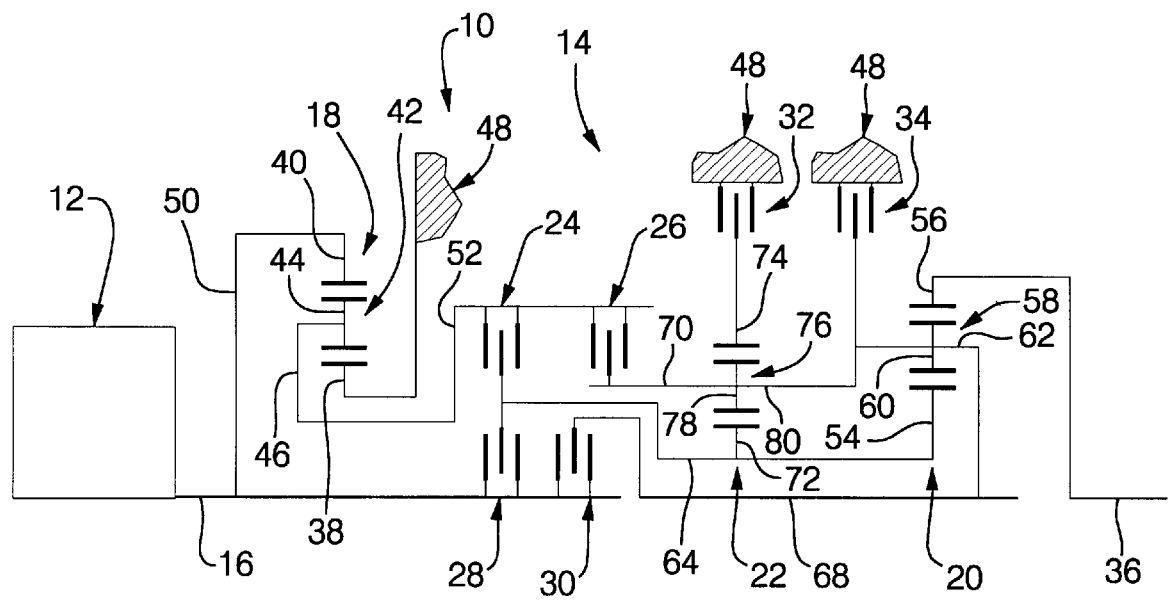
FIG. 1 is a schematic representation of a transmission incorporating one embodiment of the present invention depicting the dedicated planetary gear set as an underdrive gear set.

A powertrain 10 includes an engine and starting device 12 and a transmission 14. The starting device may include a conventional torque converter or starting clutch between the engine and starting device 12 and the transmission 14; or one of the low gear friction elements can be used as a launch device for the transmission 14. The transmission 14 has an input shaft 16, connected directly with the engine and starting device 12. The transmission 14 includes a dedicated planetary gear set 18, two simple planetary gear sets 20 and 22, six torque transmitting mechanisms 24, 26, 28, 30, 32, and 34, and an output shaft 36. The torque transmitting mechanisms 24, 26, 28, and 30 are conventional fluid operated, selectively engageable, rotating torque transmitting mechanisms or clutches and the torque transmitting mechanisms 32, and 34 are conventional fluid operated, selectively engageable, stationary torque transmitting mechanisms or brakes. The torque transmitting mechanisms are preferably controlled by a conventional electro-hydraulic control mechanism having a pressure source and electronic control unit with a conventional preprogrammable digital computer.

The planetary gear set 18 includes a sun gear member 38, a ring gear member 40 and a planet carrier assembly member 42 that includes a plurality of pinion gears 44 rotatably supported on a spider or cage 46. The pinion gears 44 mesh with both the sun gear member 38 and the ring gear member 40. The sun gear member 38 is continuously connected with a transmission housing 48 and is therefore a reaction member of the planetary gear set 18. The ring gear member 40 is continuously connected with the input shaft 16 through a hub 50 for unitary rotation with the engine and starting device 12, and is therefore an input member of the planetary gear set 18. If a torque converter is included in the powertrain 10, the ring gear member 40 is driven by the output of the torque converter. The planet carrier assembly member 42, an output member or the planetary gear set 18, is drivingly connected with a hub 52 that is drivingly connected with the torque transmitting mechanisms 24 and 26. The input shaft 16 is drivingly connected with the torque transmitting mechanisms 28 and 30.

The planetary gear set 20 includes a sun gear member 54, a ring gear member 56, and a planet carrier assembly member 58. The planet carrier assembly member 58 includes a plurality of pinion gear members 60 rotatably mounted on a spider or cage 62 and meshing with both the sun gear member 54 and the ring gear member 56. The sun gear member 54 is continuously connected with a shaft and hub assembly 64. The planet carrier assembly member 58 is continuously connected with a shaft and hub assembly 68 and with a hub 70. The ring gear member 56 is continuously connected with the output shaft 36. The assembly 64 is connected with the torque transmitting mechanism 24 and 28. The assembly 68 is connected with the torque transmitting mechanism 30. The hub 70 is connected with the torque transmitting mechanisms 26 and 34.

The planetary gear set 22 includes a sun gear member 72, a ring gear member 74 and a planet carrier assembly member 76 which has a plurality of pinion gears 78 rotatably mounted on a cage or spider 80 and meshing with both the sun gear member 72 and the ring gear member 74. The sun gear member 72 is connected with the hub 64 and the sun gear member 54. The planet carrier assembly member 76 is connected with the planet carrier assembly member 58 and with the hub 70. The ring gear member 74 is operatively connected with the torque transmitting mechanism 32.

The planetary gear set 18 provides an underdrive ratio at the hub 52. Thus when the torque transmitting mechanism 24 is engaged, the sun gear members 54 and 72 are rotated at a speed proportional to but less than the speed of the engine and starting device 12. When the torque transmitting mechanism 26 is engaged, the planet carrier assembly members 58 and 76 are rotated at a speed proportional to but less than the speed of the engine and starting device 12. When the torque transmitting mechanism 28 is engaged, the sun gear members 54 and 72 are rotated at a speed equal to the speed of the engine and starting device 12. When the torque transmitting mechanism 30 is engaged, the planet carrier assembly members 58 and 76 are rotated at a speed equal to the speed of the engine and starting device 12. When the torque transmitting mechanism 32 is engaged, the ring gear member 74 is restrained from rotation and when the torque transmitting mechanism 34 is engaged, the planet carrier assembly members 58 and 76 are restrained from rotation.

Figure 2:
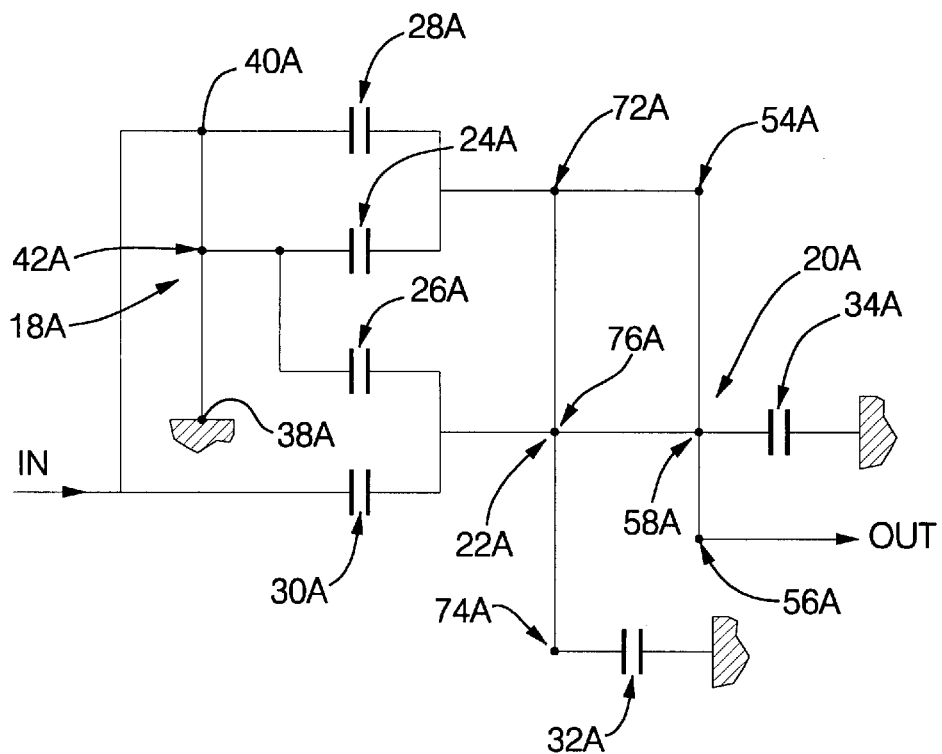
FIG. 2 is a lever diagram of the transmission shown in FIG. 1.

FIG. 2 is a lever diagram representation of the schematic of FIG. 1. The levers have been given the same numerical designation with an 'A' suffix as the planetary gear set represented thereby, and the nodes of the levers have been given the same numerical designation with an 'A' suffix as the gear member represented thereby. The torque transmitting mechanisms are likewise designated.

To establish the reverse drive ratio in the transmission 10, the torque transmitting mechanisms 24 and 34 are engaged. The sun gear member 54 becomes an input member and the planet carrier assembly member 58 becomes a reaction member. In the lever diagram, the node 58A is the fulcrum, the node 54A is the input, and the node 56A is the output. The sun gear member 54 will rotate at the speed of the planet carrier assembly member 42 which is reduced from the speed of the engine and starting device 12 by the planetary gear set 18. The output member is the ring gear member 56 (node 56A) which will rotate opposite to the input member. This reverse drive ratio is determined by both planetary gear sets 18 and 20. A second reverse drive ratio is available with the engagement of the torque transmitting mechanisms 28 and 34. The input (sun gear member 54), the reaction (planet carrier assembly member 58) and output (ring gear member 56) members remain the same, however, the sun gear member 54 will be rotating at engine speed. This reverse drive ratio is determined by the planetary gear set 20.

A neutral condition is attained by releasing all of the torque transmitting mechanisms, however, the torque transmitting mechanism 24 can remain engaged. This will permit a simpler, control wise, reverse/forward interchange as only one torque transmitting mechanism will be controlled through the shift sequence.

The first (lowest) forward drive ratio is established by the engagement of the torque transmitting mechanisms 24 and 32. The sun gear members 72 and 54 (nodes 72A, 54A) are input members that rotate at the speed of the planet carrier assembly member 42 (node 42A). The ring gear member 74 (node 74A) is a reaction member and the planet carrier assembly members 76 and 58 (nodes 76A and 56A) rotate at a speed determined by the planetary gear set 22 (lever 22A). The planet carrier assembly member 58 is therefore also an input member for the planetary gear set 20 (lever 20A). The combination of the speeds of the sun gear member 54 and the planet carrier assembly member 58 result in a forward speed at the ring gear member 56 at an input/output ratio determined by the planetary gear sets 18, 20 and 22 (levers 18A, 20A and 22A).

The second forward drive ratio is determined by the interchange of the torque transmitting mechanisms 24 and 28. With this interchange, the sun gear members 54 and 72 are rotated at the speed of the engine and starting device 12. This will also increase the speed of the planet carrier assembly members 76 and 58 as well as the ring gear member 56. The second forward drive ratio is determined by the planetary gear sets 20 and 22 (levers 20A and 22A).

The third forward drive ratio is determined by the interchange of the torque transmitting mechanisms 28 and 26. This will establish the planet carrier assembly members 76 and 58 (nodes 76A, 58A) as input members which are rotated at the speed of the planet carrier assembly member 42 (node 42A). the ring gear member 74 (node 74A) remains the reaction member. The sun gear members 72 and 54 (nodes 72A, 54A) will be overdriven in the forward direction at a speed determined by the planetary gear set 22 (lever 22A). The planetary gear set 20 (lever 20A) will have two input factors imposed thereon. Due to the ratio of the planetary gear set 20, the ring gear member 56 will be rotated in the forward direction at a speed less than the input speed of the engine and starting device 12. The third forward drive ratio is determined by the planetary gear sets 18, 20 and 22 (levers 18A, 20A and 22A).

The fourth forward drive ratio is established with the interchange of the torque transmitting mechanisms 26 and 30. The planet carrier assembly members 76 and 58 remain the input members and the ring gear member 74 remains the reaction member. The planet carrier assembly members 76 and 58 are rotated at the speed of the engine and starting device 12 which will cause an increase in the speed of the ring gear member 56 and therefore the output shaft 36. The fourth forward drive ratio is also determined by the planetary gear sets 20 and 22.

The fifth forward drive ratio is established by the simultaneous release of torque transmitting mechanisms 30 and 32 and the engagement of the torque transmitting mechanisms 26 and 28. This is a double transition shift sequence or double transition ratio interchange that can be accomplished by the electronic control without any significant interruption of torque transmission through the interchange. The sun gear members 72 and 54 (nodes 72A, 54A) are rotating at engine speed and the planet carrier assembly members 76 and 58 (nodes 76A, 58A) are rotating at a speed determined by the planetary gear set 18 (lever 18A). The speed of the ring gear member 56 and output shaft 36 are determined by the ratios of the planetary gear sets 18 and 20

(levers 18A, 20A). The rotational direction of the output shaft 36 is in the same direction as the input shaft 16 but at a reduced speed.

If it is desired to eliminate the double transition shift sequence, the controller can be programmed to provide a third to fifth interchange. On a third to fifth interchange, the torque transmitting mechanisms 32 and 24 are swapped while the torque transmitting mechanism 30 remains engaged. The controller can be programmed to determine which shift sequence is preferable depending on the control signals (engine speed, engine torque, output speed, etc.) that are present. An alternative to skip shifting is to select the tooth ratios of the planetary gear sets such that the third to fifth shift interchange is within an acceptable range and the fourth forward drive ratio can be eliminated.

The sixth forward drive ratio is established with the interchange of torque transmitting mechanisms 28 and 24 while torque transmitting mechanism 26 remains engaged. The sun gear members 72 and 54 and the planet carrier assembly members are rotated at a reduced speed as determined by the planetary gear set 18 (lever 18A). Since the sun gear member 54 and the planet carrier assembly member 58 are rotating at the same speed, the sixth forward drive ratio is determined by the gear tooth ratios of the planetary gear set 18.

The seventh forward speed ratio is established by the disengagement of the torque transmitting mechanisms 24 and 26 and the substantially simultaneous engagement of the torque transmitting mechanisms 28 and 30. This is a double transition shift sequence. In the seventh forward drive ratio, the sun gear members 72 and 54 and the planet carrier assembly members are all rotating at the speed of the input shaft 16. The seventh forward drive ratio is a direct drive wherein the output shaft 36 and the input shaft 12 rotate at the same speed. The controller can also determine if a five to seven interchange is more preferable than a five to six to seven depending on the control signals available.

The eighth forward drive ratio is established by the interchange of the torque transmitting mechanisms 28 and 24. The sun gear members 72 and 54 are therefore rotating at a reduced speed as determined by the gear tooth ratio of the planetary gear set 18 and the planet carrier assembly members 58 and 76 are rotating at the speed of the input shaft 16. The ring gear member 56 and the output shaft 36 will rotate forwardly at a speed greater than the speed of the input shaft 16; this is an overdrive ratio. The eighth forward speed ratio is determined by the planetary gear sets 18 and 20 (levers 18A, 20A). If desired, the shift sequence can be either fifth to sixth to eighth or fifth to seventh to eighth, thereby eliminating the double transition shift sequences of fifth to sixth or sixth to seventh. If both double transition interchanges are excluded, the transmission will provide six forward drive ratios and at least one reverse drive ratio. If only the fourth to fifth double transition interchange is eliminated, the transmission will provide seven forward drive ratios and at least one reverse drive ratio.

Figure 3:
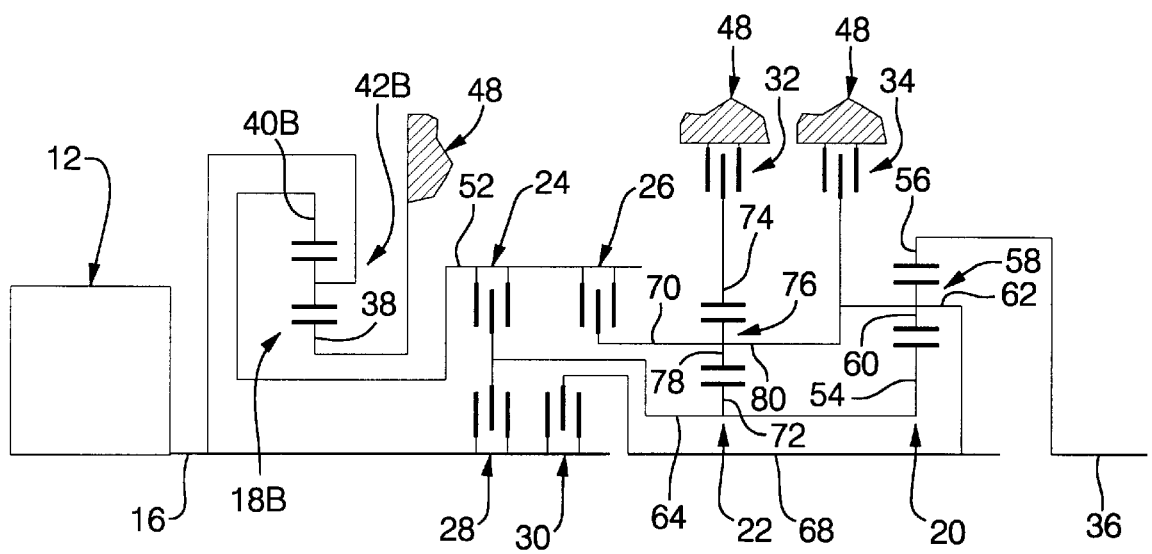
FIG. 3 is a schematic representation of a modification of the schematic shown in FIG. 1 depicting the dedicated planetary gear set as an overdrive gear set.
Figure 4:
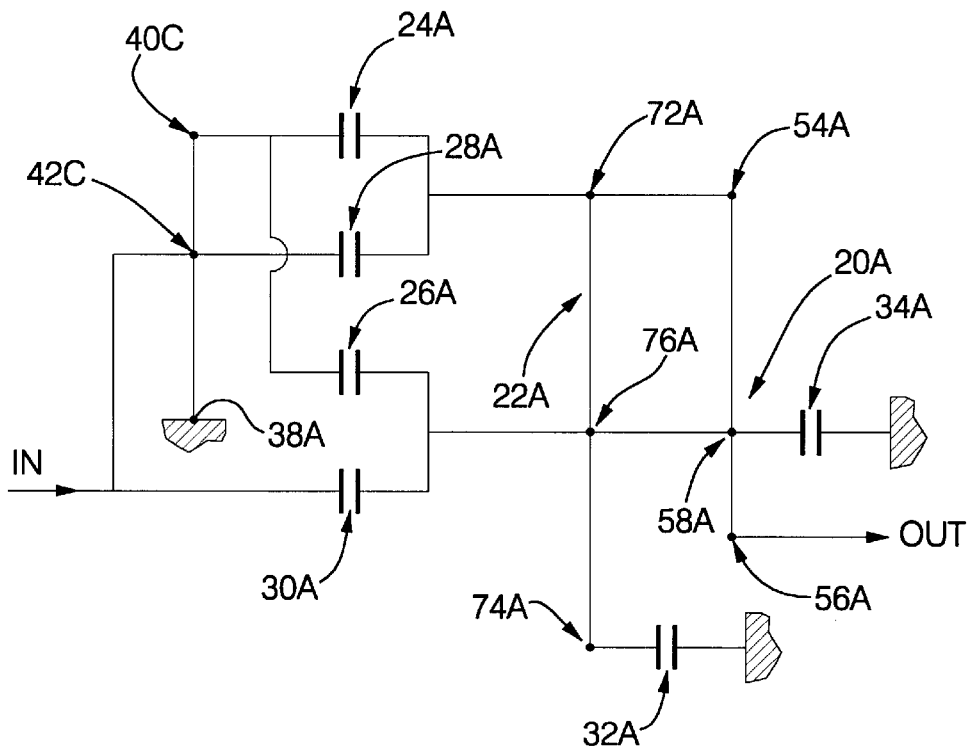
FIG. 4 is a lever diagram of the modification shown in FIG. 3.

In the modification shown in FIGS. 3 and 4, the dedicated gear set 18B includes the sun gear member 38, a ring gear member 40B and a planet carrier assembly member 42B. The planet carrier assembly member 42B is drivingly connected with the input shaft 16 and the ring gear member 40B is drivingly connected with the hub 52 and the sun gear member 38 is continuously connected with the transmission housing 48. The planetary gear sets 20 and 22 remain connected in the same manner as described for FIG. 1, however, the tooth ratios of the planetary gear sets 20 and 22 may be changed to provide the desired drive ratios. The significant difference between the transmissions shown in FIG. 1 and FIG. 2 is that the planetary gear set 18 provides an underdrive at the planet carrier assembly member 42 in FIG. 1 and an overdrive at the ring gear member 40B in FIG. 2. Thus, the rotary speed of the planet carrier assembly member 42 is proportional to but less than the speed of the engine and starting device 12; and the rotary speed of the ring gear member 40B is proportional to but greater than the speed of the engine and starting device 12.

In the lever diagram of FIG. 4, the corresponding components of the planetary gear set 18B have been given the same numeric designation with an 'A' or 'C' suffix. The torque transmitting mechanisms 24A and 26A rotate with the ring gear member 40B and therefore have an overdrive input speed. The torque transmitting mechanisms 28A and 30A have an input speed equal to the speed of the input shaft 16. The lever depictions of levers 22A and 20A remain unchanged.

The modified designated planetary gear set 18B and the planetary gear sets 20 and 22 will provide eight forward drive ratios and two reverse drive ratios through the selective engagement of pairs of the torque transmitting mechanisms 24, 26, 28, 30, 32, and 34. The neutral condition is established with all of the torque transmitting mechanisms disengaged or with only the torque transmitting mechanism 28 engaged. The first reverse drive ratio is established with the engagement of the torque transmitting mechanisms 28 and 34. The ring gear member to sun gear member tooth ratio of the planetary gear set 22 will determine the reverse drive ratio. A higher reverse drive ratio is attained with the interchange of the torque transmitting mechanisms 28 and 24. Note that the torque transmitting mechanism 24 connects the sun gear members 54, 72 with the overdrive output of the planetary gear set 18B. Therefore, the sun gear member 54 will rotate faster for a given input speed when the torque transmitting mechanism 24 is engaged as compared to when the torque transmitting mechanism 28 is engaged. This should be evident to those skilled in the art when the lever diagrams of FIGS. 2 and 4 are compared. The lower reverse drive ratio is determined by the planetary gear set 20 and the higher reverse drive ratio is determined by the planetary gear sets 18B and 20.

The first forward drive ratio is established with the engagement of the torque transmitting mechanisms 28 and 32. The sun gear members 54, 72 are rotated at the speed of the input shaft 16. The first forward drive ratio is determined by the planetary gear sets 22 and 20.

The second forward drive ratio is established by the interchange of the torque transmitting mechanisms 28 and 24 while the torque transmitting mechanism 32 remains engaged. The sun gear members 54, 72 are rotated at the speed of the overdrive output of the planetary gear set 18B and are therefore rotating faster in the second ratio than the first ratio for a given input speed. The second forward drive ratio is determined by the tooth ratios of the planetary gear sets 18B and 20.

The third forward drive ratio is established by the interchange of the torque transmitting mechanisms 24 and 30. The planet carrier assembly members 58 and 76 are rotated at the speed of the input shaft 16 and the sun gear members 72, 54 are rotated at a speed determined by the planetary gear set 22. The third forward drive ratio is determined by the tooth ratios of the planetary gear sets 20 and 22.

The fourth forward drive ratio is established by the interchange of the torque transmitting mechanisms 30 and 26. In the fourth ratio, the planet carrier assembly members 76, 58 are rotated at the speed of the overdrive output of the planetary gear set 18B. The speed of the sun gear members 72, 54 is proportional to the speed of the planet carrier assembly member 76 as determined by the tooth ratio of the planetary gear set 22. The fourth forward drive ratio is therefore determined by the tooth ratios of the planetary gear sets 18B, 20 and 22.

The fifth forward drive ratio is established by disengaging the torque transmitting mechanisms 26 and 32 and substantially simultaneously engaging the torque transmitting mechanisms 30 and 24. The sun gear members 72 and 54 are rotating at the speed of the ring gear member 40B and the planet carrier assembly members 76 and 58 are rotating at the speed of the input shaft 16. The ring gear member 56 is rotated forwardly at an underdrive ratio relative to the input shaft 16. The fifth forward drive ratio is determined by the tooth ratios of the planetary gear sets 18B and 20.

The sixth forward drive ratio is established with the interchange of the torque transmitting mechanisms 24 and 28. The sun gear member 54 and the planet carrier assembly member 58 are both rotating at the speed of the input shaft 16, therefore, the ring gear member 56 and the output shaft 36 will rotate at the speed of the input shaft 16. The sixth forward drive ratio is a direct drive ratio.

The seventh forward drive ratio is established by the disengagement of the torque transmitting mechanisms 28 and 30 and the substantially simultaneous engagement of the torque transmitting mechanisms 24 and 26. The sun gear member 54 and the planet carrier assembly member 58 rotate at the speed of the ring gear member 40B. The ring gear member 56 and the output shaft 36 also rotate at the speed of the ring gear member 40B. Therefore, the seventh forward drive ratio is an overdrive ratio that is determined by the tooth ratio of the planetary gear set 18B.

The eighth forward drive ratio is established by the interchange of the torque transmitting mechanisms 24 and 28. With this torque transmitting mechanism hookup, the sun gear member 54 will rotate at the speed of the input shaft 16 and the planet carrier assembly member 58 will rotate at the speed of the ring gear member 40B. This will cause the ring gear member 56 and the output shaft 36 to rotate at an overdrive ratio relative to the input shaft 16. This can be readily seen in FIG. 2 where the node 58A will have a longer vector than the node 54A. If a line is drawn connecting the ends of the vectors and intersecting a vector extending from the node 56A, the vector at 56A will be longer than the other two vectors indicating that the speed at the ring gear member 56 is higher than the speeds at the sun gear member 54 and the planet carrier assembly member 58. The eighth forward drive ratio is determined by the tooth ratios of the planetary gear sets 18B and 20.

Obviously the drive ratios can be change from one transmission assembly to another by changing the tooth ratios of any or all of the planetary gear sets 18 (18B), 20 and 22. It should be noted that the direct ratio (1.0 to 1.0) occurs as the seventh forward drive ratio for the gear schematic shown in FIG. 1 and as the sixth forward drive ratio for the gear schematic shown in FIG. 3. As described above in FIG. 1, the double transition shift sequences of third to fourth and sixth to seventh can be eliminated by the controller.

Figure 5:
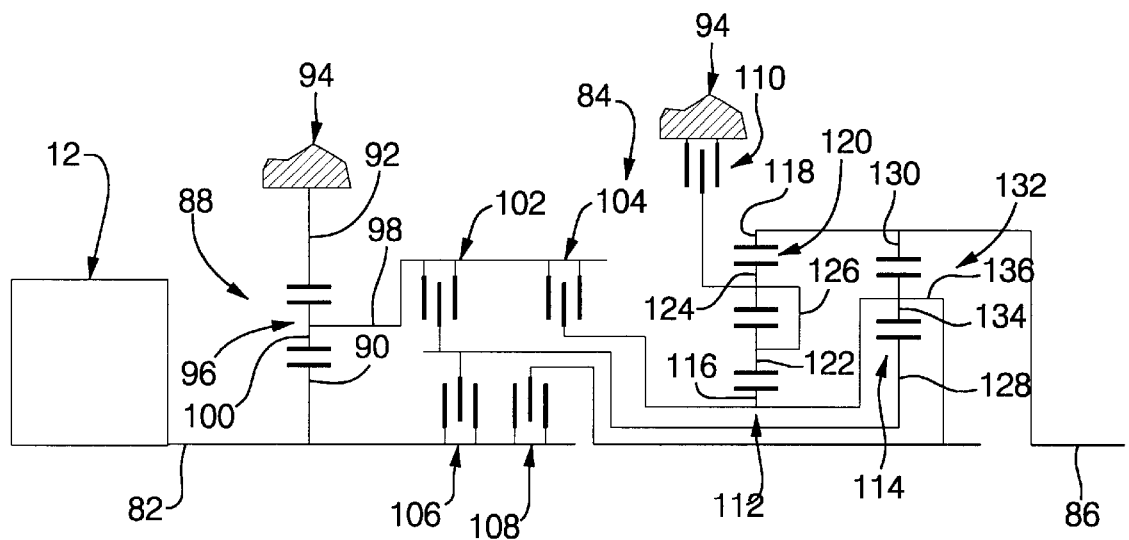
FIG. 5 is a schematic representation of a transmission incorporating another embodiment of the present invention.

The powertrain 10C, shown in FIG. 5, includes the engine and launch device 12, an input shaft 82, a planetary gear arrangement 84, and an output shaft 86. The planetary gear arrangement 84 includes a dedicated planetary gear set 88 that includes a sun gear member 90, drivingly connected with the input shaft 82, a ring gear member 92 continuously connected to the transmission case 94, and a planet carrier assembly member 96. The planet carrier assembly member has a cage or spider 98 on which is rotatably mounted a plurality of pinion gear members 100 that are disposed in meshing relation with the sun gear member 90 and the ring gear member 92.

The planetary gear arrangement 86 also includes a plurality of fluid operated, selectively engageable, torque transmitting mechanisms 102, 104, 106, 108, and 110. The torque transmitting mechanisms 102, 104, 106, and 108 are rotating torque transmitting mechanisms and the torque transmitting mechanism 110 is a stationary torque transmitting mechanism. The planetary gear arrangement further includes a compound planetary gear set 112 and a simple planetary gear set 114.

The sun gear member 90 is continuously drivingly connected with the input shaft 82. The planet carrier assembly member 96 is continuously connected with the torque transmitting mechanisms 102 and 104. The ring gear member 94 is continuously grounded to the transmission case 94. The input shaft 82 is continuously drivingly connected with the torque transmitting mechanisms 106 and 108. Whenever the input shaft 82 is rotating, the planetary gear set 88 provides an underdrive ratio between the input shaft 82 and the planet carrier assembly member 96.

The compound planetary gear set 112 has a sun gear member 116, a ring gear member 118 and a planet carrier assembly member 120 that includes a plurality of intermeshing pinion gear members 122 and 124 that are rotatably mounted on a spider or cage 126. The pinion gear member 122 also meshes with the sun gear member 116 and the pinion gear member 118 meshes with the ring gear member 118. The planetary gear set 114 includes a sun gear member 128, a ring gear member 130 and a planet carrier assembly member 132 that has a plurality of pinion gear members 134 rotatably mounted on a cage or spider 136 and disposed in meshing relation with both the sun gear member 128 and the ring gear member 130.

The sun gear member 116 and the planet carrier assembly member 132 are selectively connectable with the planet carrier assembly member 96 through the torque transmitting mechanism 104 and with the input shaft 82 through the torque transmitting mechanism 108. The sun gear member 128 is selectively connectable with the planet carrier assembly member 96 through the torque transmitting mechanism 102 and with the input shaft 82 through the torque transmitting mechanism 106. The planet carrier assembly member 120 is operatively connected with the torque transmitting mechanism 110. The ring gear members 118 and 130 are continuously connected with the output shaft 86. When the torque transmitting mechanism 110 is selectively engaged, the planet carrier assembly member 120 is held stationary. When the torque transmitting mechanism 102 is selectively engaged, the sun gear member 128 rotates at the speed of the planet carrier assembly member 96. When the torque transmitting mechanism 104 is selectively engaged, the planet carrier assembly member 132 and sun gear member 112 rotate at the speed of the planet carrier assembly member 96. When the torque transmitting mechanism 106 is selectively engaged, the sun gear member 128 is rotated at the speed of the input shaft 82, and when the torque transmitting mechanism 108 is engaged, the planet carrier assembly member 136 and sun gear member 116 are rotated at the speed of the input shaft 82.

Figure 6:
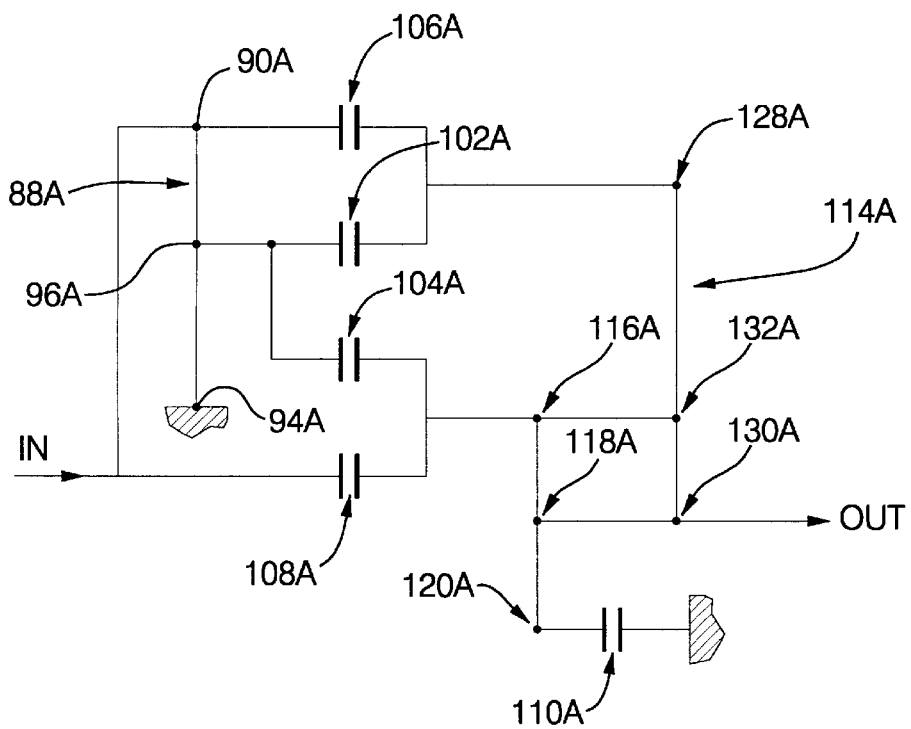
FIG. 6 is a lever diagram of the transmission shown in FIG. 3.

FIG. 6 is a lever diagram representation of the planetary gear arrangement shown in FIG. 5. The nodes of the lever diagram represent the gear elements of the planetary gear arrangement 84. Corresponding components have been given the same numerical designation as FIG. 5 with an 'A' suffix. For example, the nodes 90A, 94A, and 96A represent the sun gear member 90, ring gear member 94, and planet carrier assembly member 96 respectively. The nodes 102A, 104A, 106A, 108A, and 110A represent the corresponding torque transmitting mechanisms.

To establish the reverse drive ratio in the planetary gear arrangement 84, the torque transmitting mechanisms 104 and 106 are engaged. This results in the planet carrier assembly member 98 being driven forwardly (engine speed direction) at the reduced speed of the planet carrier assembly member 96 and the sun gear member 128 being driven forwardly at the speed of the engine 12. In viewing FIG. 6 it can be seen that the node 128A will have a vector equal to the engine speed and the node 132A will have a vector less than engine speed. By connecting the tips of the vector, it can be seen that the node 130A will have a negative vector (opposite to engine speed) which will provide a reverse rotation at the output shaft 86. If the planetary gear set 88 has a ring gear member to sun gear member tooth ratio of 1.60 and the planetary gear set 114 has a ring gear member to sun gear member tooth ratio of 1.38, the reverse drive ratio (input speed/output speed) will be a negative (−)15.364. It should be noted that the reverse drive ratio does not utilize a stationary torque transmitting mechanism.

The neutral condition is established by releasing all of the torque transmitting mechanisms. The first forward drive ratio is established by the engagement of the torque transmitting mechanisms 102 and 110. The engagement of the torque transmitting mechanism 110 establishes the planet carrier assembly member 118 (node 118A) as a reaction member of the planetary gear set 112 (lever 112A). The sun gear member 128 is driven at the speed of the planet carrier assembly member 96 and the ring gear member 130 as well as the output shaft 86 will rotate forwardly at a reduced speed determined by the tooth ratios of the planetary gear sets 88, 114, and 112. In FIG. 6 it should be noted that the input forward vector is imposed on the node 128A and the reaction is at node 120A. The resulting forward vector is developed at the nodes 118A and 130A.

The second forward drive ratio is established by the interchange of the torque transmitting mechanisms 102 and 104. The sun gear member 118 (node 118A) is driven forwardly at the speed of the planet carrier assembly member 96 (96A) and the planet carrier assembly member 120 (node 120A) remains the reaction member. The forward input vector is moved from the node 128A (1$^{st}$ gear) to the node 116A, 132A (2$^{nd}$ gear) which results in a relatively larger vector at the node 118A/130A and the output shaft 86. The second forward drive ratio is determined by the tooth ratios of the planetary gear set 88 and 112.

The third forward drive ratio is established by the interchange of the torque transmitting mechanisms 110 and 102. The sun gear member 102 and the planet carrier assembly member 132 are both rotated forwardly at the speed of the planet carrier assembly member 96. Therefore the ring gear member 130 and the output shaft 86 rotate forwardly at the speed of the planet carrier assembly member 96 which is determined by the tooth ratios of the ring gear member 92 and the sun gear member 90. If, as set forth for the reverse drive ratio, the tooth ratio of the planetary gear set 88 is 1.60, the third forward drive ratio will be 2.60. Thus the third forward drive ratio is determined by the tooth ratio of the planetary gear set 88.

The fourth forward drive ratio is established by the disengagement of the torque transmitting mechanisms 102 and 104 and the substantially simultaneous engagement of the torque transmitting mechanisms 106 and 110. This is a double transition shift sequence. The planet carrier assembly member 120 (node 120A) is again the reaction member for the planetary gear arrangement 84. The sun gear member 128 (node 128A) is rotated forwardly at the speed of the input shaft 82 and the ring gear members 118, 130 (nodes 118A, 130A) are rotated forwardly at a reduced speed. The fourth forward drive ratio is similar the first forward drive ratio. However, in the fourth forward drive ratio the planetary gear set 88 is not effective so that the fourth forward drive ratio is determined by the tooth ratios of the planetary gear sets 112 and 114. The double transition shift sequence can be eliminated by permitting the controller to enforce a second to fourth interchange wherein the torque transmitting mechanisms 104 and 106 are swapped while the torque transmitting mechanism 110 remains engaged.

The fifth forward drive ratio is established by the interchange of the torque transmitting mechanisms 106 and 108. The planet carrier assembly member 120 (node 102A) remains the reaction member while the sun gear member 116 (node 116A) becomes the input member. The ring gear members 118 and 130 (nodes 118A and 130A) are rotated forwardly at a reduced ratio determined by the tooth ratio of the planetary gear set 112. It should be noted that due to the compound arrangement of the planetary gear set 112 that the ring gear member 118 rotates in the same direction as the sun gear member 116.

The sixth forward drive ratio is established by the interchange of the torque transmitting mechanisms 110 and 106 while the torque transmitting mechanism 108 remains engaged. The sun gear member 128 and the planet carrier assembly member 132 are both rotated at the speed of the input shaft. Therefore, the ring gear member 130 and the output shaft 86 are rotated at the speed of the input shaft. The sixth forward drive ratio is a direct drive or a one to one ratio.

The seventh forward drive ratio is established by the interchange of the torque transmitting mechanisms 106 and 102 while the torque transmitting mechanism 108 remains engaged. The sun gear member 102 (node 102A) is rotated forwardly at the speed of the planet carrier assembly member 96 (node 96A) and the planet carrier assembly member 132 (node 132A) is rotated forwardly at the speed of the input shaft 82. If vectors, representing these speed values, are positioned at the respective nodes, it will be seen that the ring gear member 130 (node 130A) and the output shaft 86 will rotate forwardly at a speed greater than the input shaft 82. The seventh forward drive ratio is an overdrive ratio determined by the tooth ratios of the planetary gear sets 88 and 114. When the double transition shift sequence is eliminated, the planetary gear arrangement of FIG. 5 will provide a transmission with six forward drive ratios instead of seven.

The planetary gear arrangement 84 provides seven forward drive ratios and one reverse drive ratio with three planetary gear sets and five torque transmitting mechanisms when double transition shifting is permitted by the controller. The reverse drive ratio is established without the use of a stationary torque transmitting mechanism. The planetary gear arrangements 14, 14B provide eight forward drive ratios and two reverse drive ratios with the three planetary gear sets and six torque transmitting mechanisms. The reverse drive ratios of the planetary gear arrangements 14, 14B each employ a stationary torque transmitting mechanism. Those skilled in the art will recognize that the reverse drive ratio of the planetary gear arrangement 84 uses a combination of rotating torque transmitting mechanisms (104, 106) that produce a forward drive ratio in the planetary gear arrangements 14, 14A (torque transmitting mechanisms 26, 28). This is due to the tooth ratios of the planetary gear sets 114 and 20.

What is claimed is:

1. A power transmission comprising:

a transmission housing;

an engine driven input shaft;

an output shaft;

a dedicated planetary gear set having a first member continuously connected with said engine driven input shaft, a second member continuously connected with said transmission housing, and a third member;

first and second selectively engageable torque transmitting mechanisms operatively connected with said third member of said dedicated planetary gear set;

third and fourth selectively engageable torque transmitting mechanisms operatively connected with said engine driven input shaft;

a fifth selectively engageable torque transmitting mechanism;

a second planetary gear set having a first member operatively connected with both said first and third torque transmitting mechanisms, a second member operatively connected with said second and fourth torque transmitting mechanisms, and a third member continuously connected with said output shaft;

a third planetary gear set having a first member continuously connected with one of said first member of said second planetary gear set and said second member of said second planetary gear set, a second member continuously connected with said second member of said second planetary gear set when said first member of said third planetary gear set is connected with said first member of said second planetary gear set, and operatively connected with said fifth torque transmitting mechanism when said member of said third planetary gear set is connected with said second member of said second planetary gear set, and a third member being operatively connected with said fifth torque transmitting mechanism when said first member of said third planetary gear set is connected with said first member of said second planetary gear set and said second member of said third planetary gear set is connected with said second member of said second planetary gear set and continuously connected with said output shaft when said first member of said third planetary gear set is connected with said second member of said second planetary gear set and said second member of said third planetary gear set is connected with said fifth torque transmitting mechanism; and said first, second, third, and fourth torque transmitting mechanisms being rotating devices, and said fifth torque transmitting mechanism being a stationary device, and said torque transmitting mechanisms being selectively engaged in combinations of two to establish at least six forward drive ratios and at least one reverse drive ratio between said engine driven input shaft and said output shaft.

2. The power transmission defined in claim 1 further comprising:

said third member of said dedicated planetary gear set being a planet carrier assembly member and being rotatable at a speed proportional to but slower than said engine driven input shaft when said engine input shaft is rotating; and said first members of said second and third planetary gear sets being sun gear members, said second members of said second and third planetary gear sets being planet carrier assembly members, and said third members of said second and third planetary gear sets being ring gear members.

3. The power transmission defined in claim 1 further comprising:

said third member of said dedicated planetary gear set being a ring gear member and being rotatable at a speed proportional to but faster than said engine driven input shaft when said engine input shaft is rotating; and said first members of said second and third planetary gear sets being sun gear members, said second members of said second and third planetary gear sets being planet carrier assembly members, and said third members of said second and third planetary gear sets being ring gear members.

4. The power transmission defined in claim 1 further comprising:

said torque transmitting mechanisms being engaged in combinations of two to establish at least seven forward drive ratios with one double transition interchange; and at least six forward drive ratios with the elimination of said double transition interchange.

5. The power transmission defined in claim 4 wherein said double transition interchange occurs between a third forward drive ratio and a fourth forward drive ratio, and a shift sequence from said third forward drive ratio to a fifth forward drive ratio is accomplished when said double transition interchange is eliminated.

6. A power transmission comprising:

a transmission housing;

an engine driven input shaft;

an output shaft;

a dedicated planetary gear set having a first member continuously connected with said engine driven input shaft, a second member continuously connected with said transmission housing, and a third member;

first and second selectively engageable rotating torque transmitting mechanisms operatively connected with said third member of said dedicated planetary gear set;

third and fourth selectively engageable rotating torque transmitting mechanisms operatively connected with said engine driven input shaft;

fifth and sixth selectively engageable stationary torque transmitting mechanism;

a first simple planetary gear set having a sun gear member connected with said first and third torque transmitting mechanisms, a ring gear member continuously connected with said output shaft, and a planet carrier assembly member connected with said second, fourth and sixth torque transmitting mechanisms;

a second simple planetary gear set having a sun gear member continuously connected with said sun gear member of said first simple planetary gear set, a ring gear member operatively connected with said fifth torque transmitting mechanism, and a planet carrier assembly member continuously connected with said planet carrier assembly member of said first simple planetary gear set; and said torque transmitting mechanisms being selectively engageable in combination of two for establishing at least seven forward drive ratios and one reverse drive ratio between said engine driven input shaft and said output shaft.

7. The power transmission defined in claim 6 further comprising:

said dedicated planetary gear set being a simple planetary gear set; and said first member of said dedicated planetary gear set being a ring gear member, said second member of said dedicated planetary gear set being a sun gear member and said third member of said dedicated planetary gear set being a planet carrier assembly member.

8. The power transmission defined in claim 6 further comprising:

said dedicated planetary gear set being a simple planetary gear set; and said first member of said dedicated planetary gear set being a planet carrier assembly member, said second member of said dedicated planetary gear set being a sun gear member and said third member of said dedicated planetary gear set being a ring gear member.

9. The power transmission defined in claim 6 further comprising:

said torque transmitting mechanisms being engaged in combinations of two to establish at least seven forward drive ratios with one double transition interchange; and at least six forward drive ratios with the elimination of said double transition interchange.

10. The power transmission defined in claim 9 wherein said double transition interchange occurs between a third forward drive ratio and a fourth forward drive ratio, and a shift sequence from said third forward drive ratio to a fifth forward drive ratio is accomplished when said double transition interchange is eliminated.

11. The power transmission defined in claim 6 further comprising:

said torque transmitting mechanisms being engaged in combinations of two to establish at least eight forward drive ratios with two double transition interchanges; and at least six forward drive ratios with the elimination of said double transition interchanges.

12. The power transmission defined in claim 11 wherein a first of said double transition interchanges occurs between a third forward drive ratio and a fourth forward drive ratio and a second of said double transition interchanges occurs between a sixth forward drive ratio and a seventh drive ratio, and a shift sequence from said third forward drive ratio to a fifth forward drive ratio is accomplished when said first double transition interchange is eliminated and a shift sequence from a fifth forward drive ratio to a seventh drive ratio is accomplished when said second double transition interchange is eliminated.

13. A power transmission comprising:

a transmission housing;

an engine driven input shaft;

an output shaft;

a dedicated planetary gear set having a first member continuously connected with said engine driven input shaft, a second member continuously connected with said transmission housing, and a third member;

first and second selectively engageable rotating torque transmitting mechanisms operatively connected with said third member of said dedicated planetary gear set;

third and fourth selectively engageable rotating torque transmitting mechanisms operatively connected with said engine driven input shaft;

fifth selectively engageable stationary torque transmitting mechanism;

a simple planetary gear set having a sun gear member connected with said first and third torque transmitting mechanisms, a ring gear member continuously connected with said output shaft, and a planet carrier assembly member connected with said second, and fourth torque transmitting mechanisms;

a compound planetary gear set having a sun gear member continuously connected with said planet carrier assembly member of said simple planetary gear set, a planet carrier assembly member operatively connected with said fifth torque transmitting mechanism, and a ring gear member continuously connected with said ring gear member of said simple planetary gear set; and said torque transmitting mechanisms being selectively engageable in combination of two for establishing at least seven forward drive ratios and one reverse drive ratio between said engine driven input shaft and said output shaft.

14. The power transmission defined in claim 13 further comprising:

said torque transmitting mechanisms being engaged in combinations of two to establish at least seven forward drive ratios with one double transition interchange; and at least six forward drive ratios with the elimination of said double transition interchange.

15. The power transmission defined in claim 14 wherein said double transition interchange occurs between a third forward drive ratio and a fourth forward drive ratio, and a shift sequence from said third forward drive ratio to a fifth forward drive ratio is accomplished when said double transition interchange is eliminated.

* * * * *